United States Patent [19]
Uwabo et al.

[11] Patent Number: 6,072,655
[45] Date of Patent: Jun. 6, 2000

[54] MAGNETIC DISK DRIVE HAVING A POSITION DETECTION UNIT FOR DETECTING A CURRENT POSITION OF A MAGNETIC HEAD

[75] Inventors: Tsuneo Uwabo; Yoshihiro Okano; Eiichi Yoneyama; Yoshinori Tangi, all of Atsugi, Japan

[73] Assignee: Mitsumi Electric Co., Ltd., Tokyo, Japan

[21] Appl. No.: 08/792,986

[22] Filed: Feb. 3, 1997

[30] Foreign Application Priority Data

| Feb. 6, 1996 | [JP] | Japan | 8-019632 |
| May 15, 1996 | [JP] | Japan | 8-120204 |
| May 17, 1996 | [JP] | Japan | 8-123324 |
| May 17, 1996 | [JP] | Japan | 8-123328 |

[51] Int. Cl.$^7$ ................................................. G11B 5/596
[52] U.S. Cl. .............................. 360/78.11; 360/77.03; 360/106
[58] Field of Search .................. 360/78.11, 77.03, 360/78.12, 78.13, 105, 106; 369/44.28

[56] References Cited

U.S. PATENT DOCUMENTS

| 5,177,648 | 1/1993 | Inoue | 360/78.11 X |
| 5,270,886 | 12/1993 | Nigam | 360/78.11 X |
| 5,305,159 | 4/1994 | Sakai et al. | 360/77.03 X |
| 5,587,852 | 12/1996 | Yoshiura et al. | 360/78.11 X |

*Primary Examiner*—Andrew L. Sniezek
*Attorney, Agent, or Firm*—Frishauf, Holtz, Goodman, Langer & Chick, P.C.

[57] ABSTRACT

In a magnetic disk drive for driving a magnetic disk inserted thereinto, a position detection unit comprises a scale and a photointerrupter. The scale is mounted on a carriage at a side opposed to a main surface of a main frame. The scale has a plurality of slits which are equally spaced along the scale in a direction parallel to a predetermined radial direction. The photointerrupter is mounted on the main frame. The photointerrupter comprises a light-emitting section and a light-receiving section which are opposed to each other with the scale arranged therebetween. The position detection unit may comprise a magnetic scale and a magnetic sensor. The magnetic scale has a plurality of magnetic poles which extend to a in a direction parallel to with the predetermined radial direction and which are periodically reversed at regular intervals. The magnetic sensor is opposed to the magnetic scale. Preferably, the magnetic sensor may comprise of a magneto-resistive element.

4 Claims, 13 Drawing Sheets

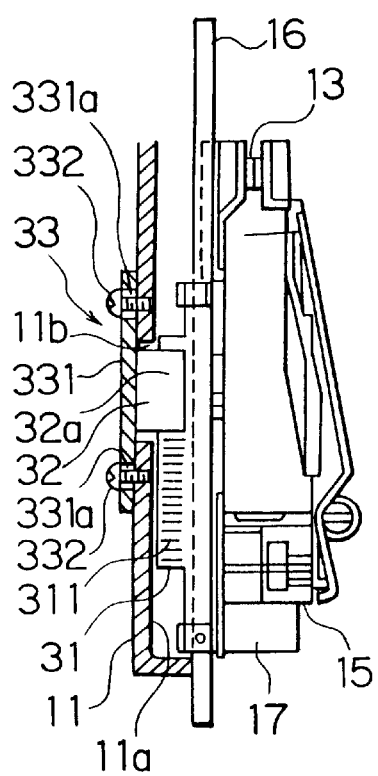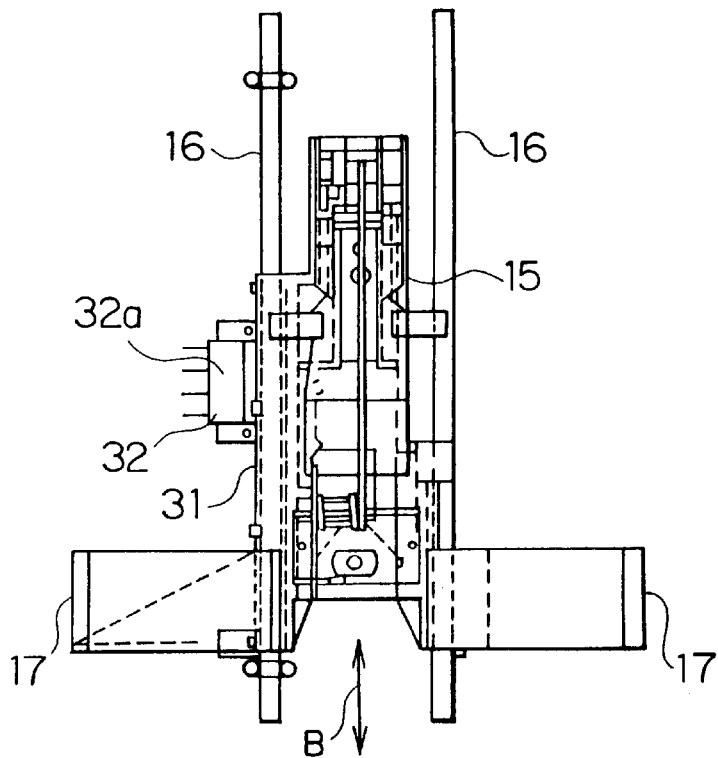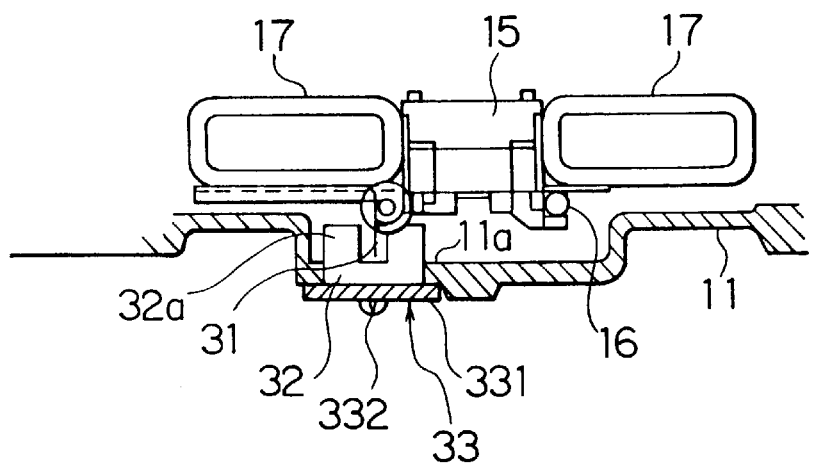
FIG. 3B    FIG. 3A
FIG. 3C

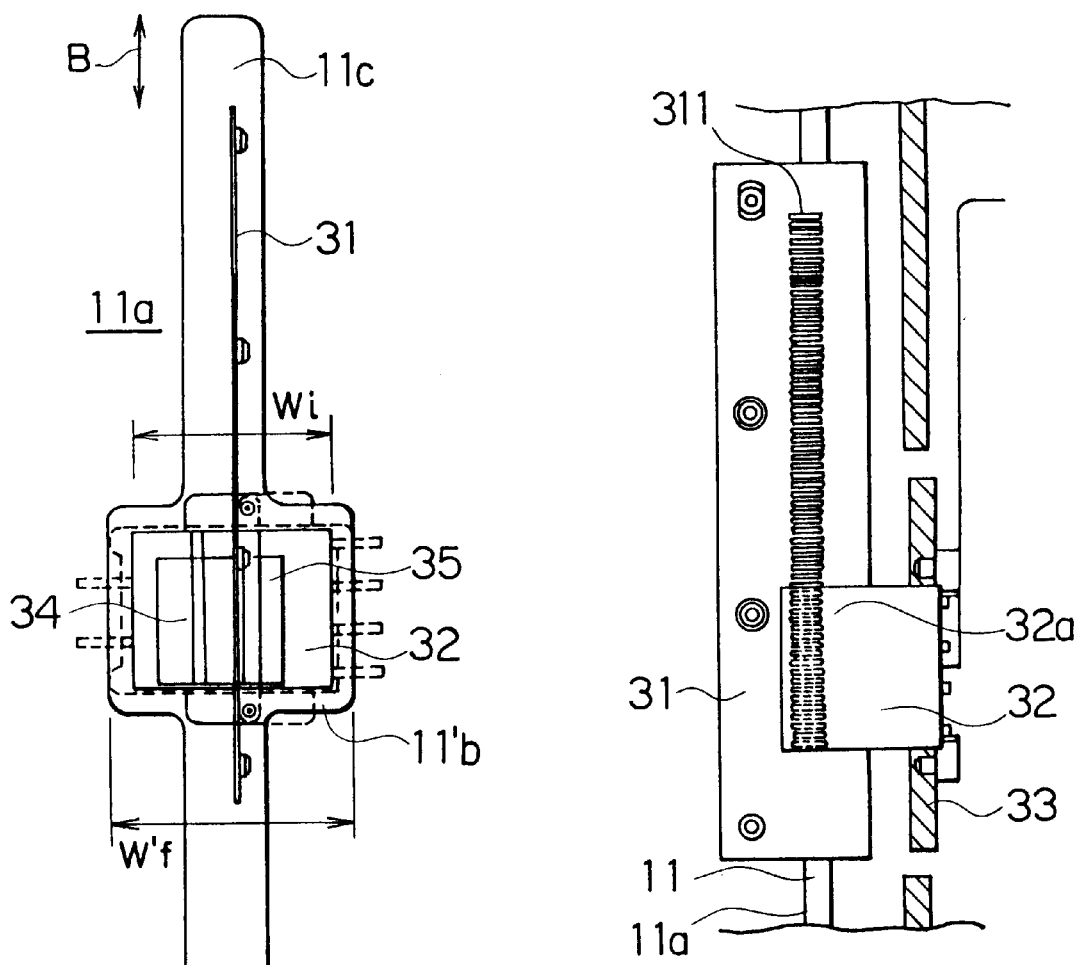
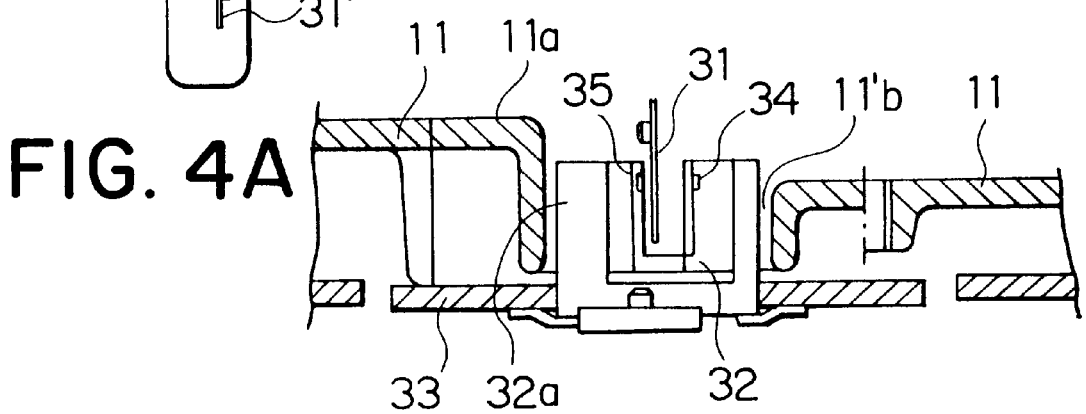
FIG. 4A
FIG. 4B
FIG. 4C

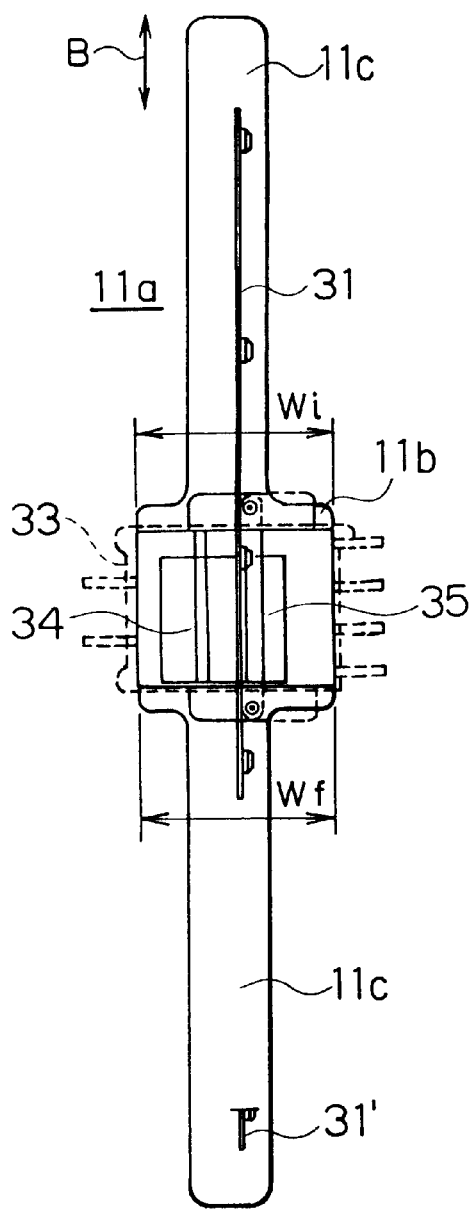
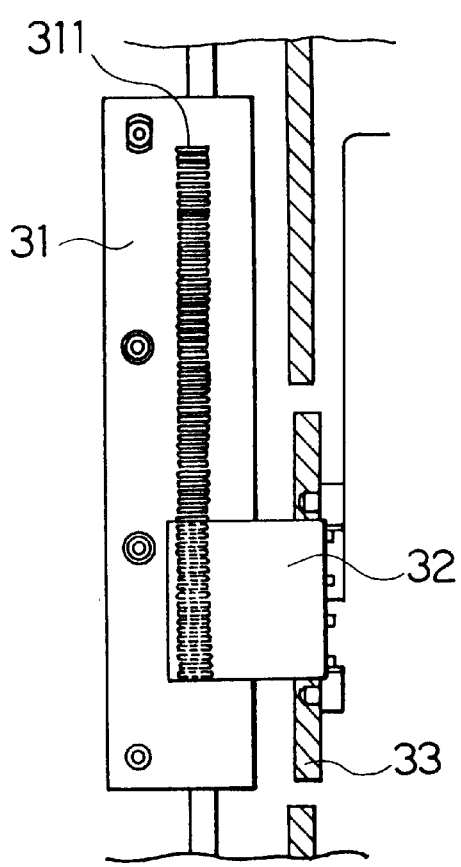
FIG. 8B
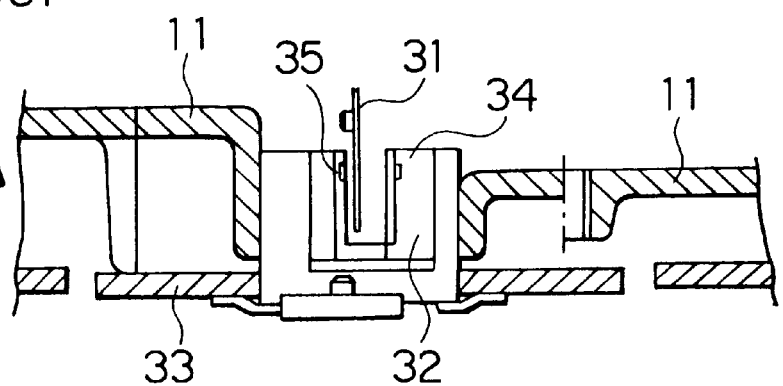
FIG. 8A
FIG. 8C

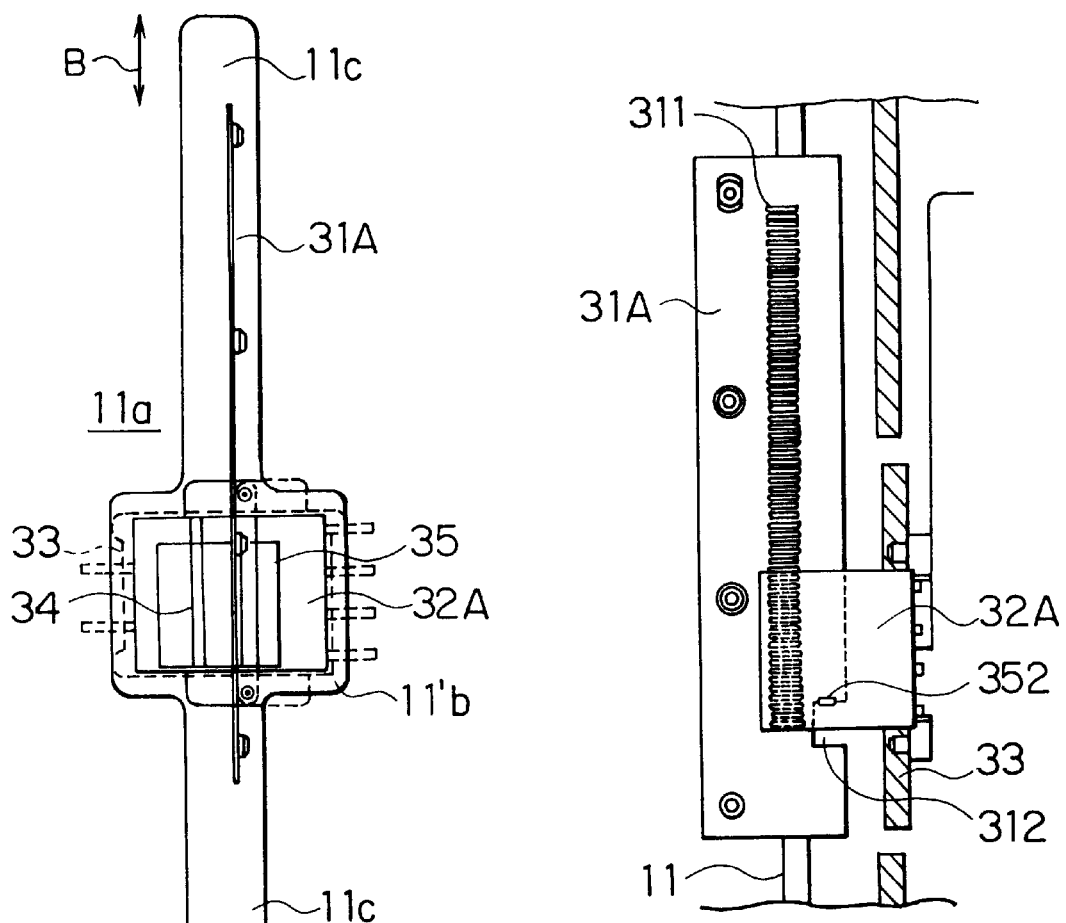
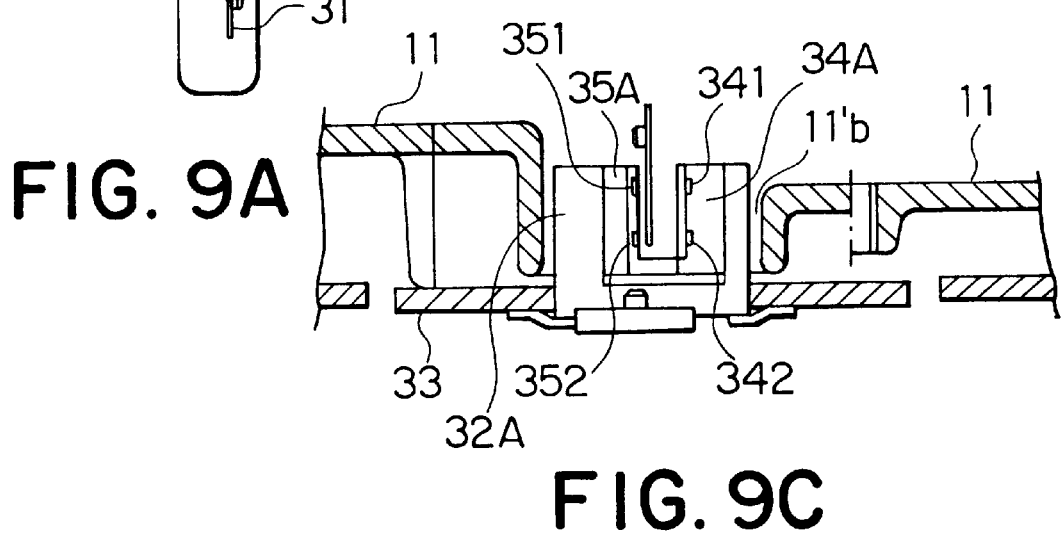
FIG. 9A
FIG. 9B
FIG. 9C

MAGNETIC DISK DRIVE HAVING A POSITION DETECTION UNIT FOR DETECTING A CURRENT POSITION OF A MAGNETIC HEAD

BACKGROUND OF THE INVENTION

This invention relates to a magnetic disk drive such as a flexible or floppy disk drive for reading/writing data from/to a magnetic disk medium of a flexible or floppy disk and, more particularly, to a position detection unit for use in positioning of a carriage for supporting a magnetic head.

As is well known in the art, a flexible or floppy disk drive (which is abbreviated to "FDD") of the type described is a magnetic disk drive for carrying out recording/reproducing of data for a magnetic disk medium of a flexible or floppy disk (which is abbreviated to "FD") inserted thereinto. In recent years, advances have been made to make the storage capacity of FDs larger. As a result, FDs having the storage capacity of 128 Mbytes (which are called large capacity FDs) have been developed as compared with FDs having storage capacity of 1 Mbyte or 2 Mbytes (which are called small capacity FDs). Under the circumstances, FDDs which are capable of recording/reproducing data for magnetic disk media of the large capacity FDs have also been developed.

Hereinunder, the FDDs capable of recording/reproducing data for magnetic disk media of the large capacity FDs alone are called high density exclusive type FDDs. The FDDs capable of recording/reproducing data for magnetic disk media of the small capacity FDs alone are called low density exclusive type FDDs. Furthermore, the FDDs capable of recording/reproducing data for magnetic disk media of both of the large and the small capacity FDs are called high/low density compatible type FDDs. In addition, the high density exclusive type FDDs and the high/low density compatible type FDDs are collectively called high density type FDDs.

A main difference in the mechanism between the low density exclusive type FDD and the high density type FDD is the structure of a driving arrangement for moving a carriage supporting a magnetic head along a predetermined radial direction for the magnetic disk medium of the FD inserted in the FDD. More specifically, the low density exclusive type FDD uses a stepping motor as the driving arrangement, while the high density type FDD uses a linear motor such as a voice coil motor (which may be abbreviated to "VCM") as the driving arrangement.

Description will now be made as regards the voice coil motor used as the driving arrangement of the high density type FDD. The voice coil motor comprises a voice coil and a magnetic circuit. The voice coil is disposed on the carriage at a rear side and is wound around a driving axis in parallel to the predetermined radial direction. The magnetic circuit generates a magnetic field which intersects current flowing in the voice coil. With this structure, by causing the current to flow in the voice coil in a direction where the magnetic field generated by the magnetic circuit intersects, a driving force occurs along a direction extending to the driving axis on the basis of interaction of the current with the magnetic field. The driving force causes the voice coil motor to move the carriage along the predetermined radial direction.

As well known in the art, the FD includes a magnetic disk medium accessed by a magnetic head. The magnetic disk medium has a plurality of tracks. The tracks include an outer most circumference track (which is named "Tr00") and an inner most circumference track. The outer most circumference track Tr00 is herein called the end most track. The small capacity FD has eighty tracks at one side.

It is necessary to position the magnetic head at a desired track position in a case where the FD is accessed by the magnetic head in the FDD. For this purpose, the carriage for supporting the magnetic head must be positioned.

In the low density exclusive type FDD using the stepping motor as the driving arrangement, it is possible to easily carry out the positioning of the carriage. This is because the stepping motor makes the carriage move step by step in response to pulses applied thereto in the low density exclusive type FDD. Accordingly, it is unnecessary for the low density exclusive type FDD to be provided with any exclusive positioning arrangement apart from the stepping motor.

On the other hand, in the high density type FDD using the linear motor as the driving arrangement, it is necessary to be provided with the exclusive positioning arrangement for positioning the carriage. This is because the linear motor makes the carriage freely move along the predetermined radial direction on the basis of current flowing in the coil and it is therefore necessary to carry out control to stop the free movement of the carriage. In order to position the carriage, it must be provided with a position detection unit for detecting a current position of the carriage or the magnetic head and a control unit for controlling the position of the carriage on the basis of the current position detected by the position detection unit.

A conventional position detection unit comprises a reflection scale mounted on a main surface of a main frame, a light-sensitive detector and a reflecting mirror which are mounted on the carriage in the manner which will later be described in detail in conjunction with FIG. 1. The light-sensitive detector includes a laser diode. However, with this structure, it is necessary to adjust a light axis for both of the light sensor and the reflecting mirror. In addition, the conventional position detection unit is expensive because the light-sensitive detector includes the laser diode. The conventional position detection unit requires a lot of parts because it comprises the reflection scale, the light-sensitive detector, and the reflecting mirror. Furthermore, the conventional position detection unit is disadvantageous in that the carriage has a bad tracking performance. This is because the carriage must be provided with the light-sensitive detector having a relatively heavy weight and the carriage is therefore too heavy.

SUMMARY OF THE INVENTION

It is therefore an object of this invention to provide a magnetic disk drive with a detection unit which is capable of omitting adjustment of a light axis.

It is another object of this invention to provide a magnetic disk drive with a detection unit of the type described, which is inexpensive.

It is still another object of this invention to provide a magnetic disk drive with a detection unit of the type described, which is implemented by a few parts.

It is yet another object of this invention to provide a magnetic disk drive with a detection unit of the type described, which is capable of improving a tracking performance for a carriage.

It is a further object of this invention to provide a magnetic disk drive with a detection unit of the type described, which is capable of detecting not only a current position of a magnetic head but also a position corresponding to the end most track.

It is a still further object of this invention to provide a magnetic disk drive with a detection unit of the type described, which is capable of stably positioning a photo-interrupter.

Other objects of this invention will become clear as the description proceeds.

On describing the gist of this invention, it is possible to be understood that a magnetic disk drive drives a magnetic disk inserted thereinto. The magnetic disk drive comprises a main frame having a main surface, a magnetic head for reading/writing data from/to the magnetic disk, a carriage for supporting the magnetic head with a space left between the carriage and the main surface of the main frame, a linear motor for moving the carriage along a predetermined radial direction, and a position detection unit for detecting a current position of the magnetic head.

According to an aspect of this invention, the above-understood position detection unit comprises a scale mounted on the carriage at a side opposed to the main surface of the main frame. The scale extends along both of a direction in parallel with the predetermined radial direction and a plane perpendicular to the main surface of the main frame. The scale has a plurality of light transmission/shield elements which are equally spaced along the direction in parallel with the predetermined radial direction. Mounted on the main frame, a photointerrupter includes a sensor section comprising a light-emitting section and a light-receiving section which are opposed to each other with the scale put therebetween.

In the above-understood detection unit, the magnetic disk has a plurality of tracks which are concentric with one another. The scale further may have an additional light transmission/shield element for detecting a position corresponding to the end most track in the magnetic disk. The sensor section further may comprises an additional light-emitting section and an additional light-receiving section at a position corresponding to the additional light transmission/shield element.

According to another aspect of this invention, the afore-understood detection unit comprises a magnetic scale mounted on the main surface of the main frame. The magnetic scale has a plurality of magnetic poles which extend to a direction in parallel with the predetermined radial direction and which are periodically reversed at regular intervals. A magnetic sensor is mounted on the carriage with the magnetic sensor opposed to the magnetic scale.

According to still another aspect of this invention, the afore-understood detection unit comprises a magnetic scale mounted on the carriage at a side opposed to the main surface of the main frame. The magnetic scale has a plurality of magnetic poles which extend to a direction in parallel with the predetermined radial direction and which are periodically reversed at regular intervals. A magnetic sensor is mounted on the main surface of the main frame with the magnetic sensor opposed to the magnetic scale.

In the afore-understood detection unit, preferably the magnetic sensor may consist of a magneto-resistive element having resistance which varies in dependence on strength of magnetic field.

BRIEF DESCRIPTION OF THE DRAWING

FIGS. 3A through 3B collectively show the position detection unit according to the first embodiment of this invention;

FIGS. 4A through 4C collectively show a position detection unit according to a second embodiment of this invention;

FIGS. 8A through 8C collectively show the position detection unit according to the third embodiment of this invention;

FIGS. 9A through 9C collectively show a position detection unit according to a fourth embodiment of this invention and FIG. 9D shows a modification thereof;

DESCRIPTION OF THE PREFERRED EMBODIMENTS

Figure 1:
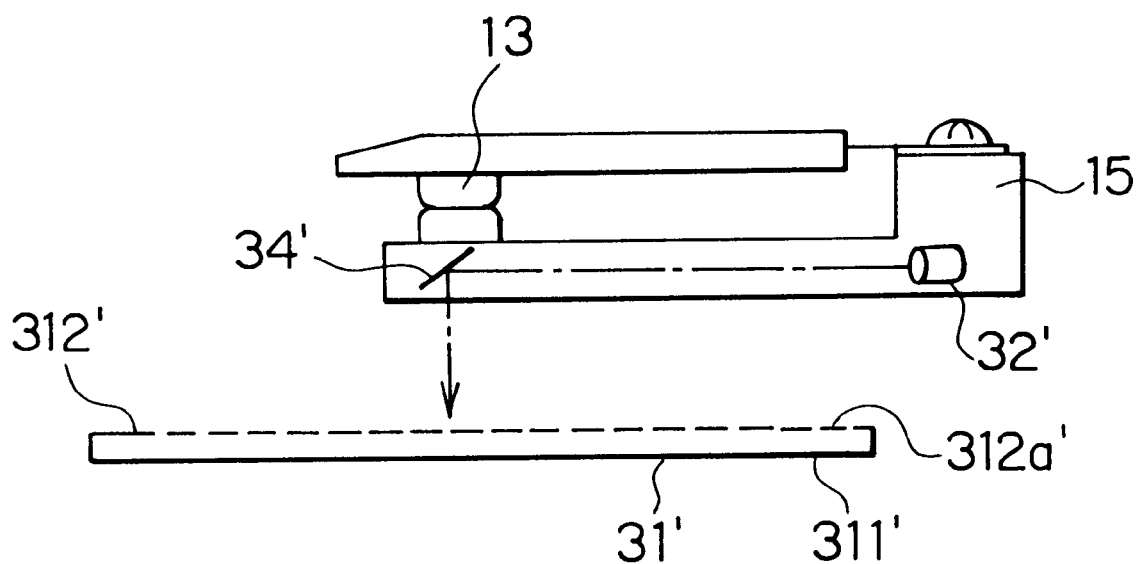
FIG. 1 is a schematic side view of a conventional position detection unit.

Referring to FIG. 1, a conventional position detection unit will be described in order to facilitate an understanding of the invention. The illustrated detection unit comprises a reflection scale 31', a light-sensitive detector 32', and a reflecting mirror 34'. The reflection scale 31' is mounted on a main surface of a main frame (not shown) with the reflection scale 31' fixed to the main frame. The light-sensitive detector 32' and the reflecting mirror 34' are mounted on a carriage 15 for supporting a magnetic head 13. More specifically, the light-sensitive detector 32' is mounted on the carriage 15 at a rear side. The light-sensitive detector 32' comprises a light-emitting section (not shown) consisting of a laser diode (LD) and a light-receiving section (not shown) consisting of a phototransistor. The reflecting mirror 34' is mounted on the carriage 15 at a front end. The light-emitting section emits a light beam which is propagated along a light axis to the front end of the carriage 15 in a horizontal direction and then reflected by the reflecting mirror 34' at right angle to the light axis to turn to the reflection scale 31' in a vertical direction. The reflection scale 31' comprises a reflection plate 311' and a scale section 312'. The reflection plate 311' reflects the reflected light beam from the reflecting mirror 34' to turn to the reflecting mirror 34' again. The scale section 312' is opposed to the reflection plate 311' at a side of the carriage 15 with a space left therebetween. The scale section 312' has a plurality of slits 312a' indicative of position information of the carriage 15. The slits 312a' are bored through the scale section 312' at regular intervals along a direction in parallel with a predetermined radial direction. That is, only the light beam passing through any slit 312a' is turned back to the light-sensitive detector 32' via the reflecting mirror 34' to receive by the light-receiving section of the light-sensitive detector 32'. Accordingly, it is possible to determine a current position of the carriage 15 or the magnetic head 13 by counting the number of reception light pulses in the light-receiving section of the light-sensitive detector 32'.

However, in the above-mentioned conventional position detection unit, it is necessary to adjust the light axis for both of the light-sensitive detector 32' and the reflecting mirror 34'. In addition, the conventional position detection unit is expensive because the light-sensitive detector 32' includes the laser diode. The conventional detection unit must be manufactured by assembling a lot of parts such as the reflection scale 31', the light-sensitive detector 32', and the reflecting mirror 34'. Furthermore, the conventional position detection unit is disadvantageous in that the carriage 15 has bad tracking performance. This is because the carriage 15 must be provided with the light-sensitive detector 32' having a relatively heavy weight and the carriage 15 is therefore too heavy.

Figure 2:
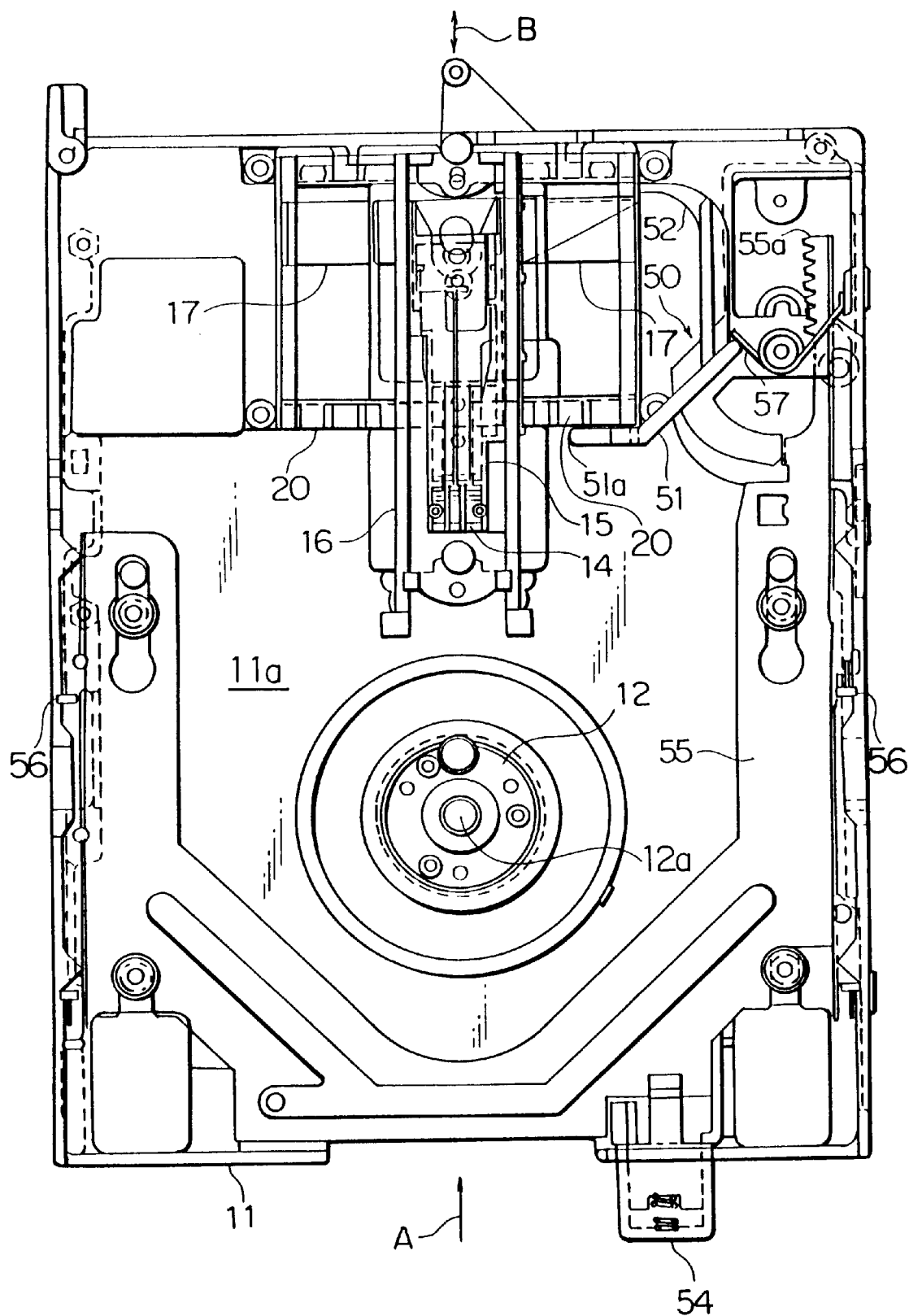
FIG. 2 is a plan view of a magnetic disk drive comprising a position detection unit according to a first embodiment of this invention.

Referring to FIG. 2, description will proceed to an FDD comprising a position detection unit according to a first embodiment of this invention. The illustrated FDD is a drive unit for carrying out recording/reproducing of data for a magnetic disk medium of an FD (not shown). The FD is inserted into the FDD from an insertion direction indicated by an arrow A in FIG. 2. FIG. 2 shows a state where the FD is inserted into the FDD. The FD has a disk center axis.

The FDD comprises a main frame 11 having a main surface 11a and a disk table assembly 12 which is rotatably supported on the main surface 11a of the main frame 11. The disk table assembly 12 has an assembly center axis 12a. The inserted FD is held on the disk table assembly 12 so that the assembly center axis 12a coincides with the disk center axis. The disk table assembly 12 is rotatably driven by a drive motor (not shown), which is mounted on the main frame 11, thereby the magnetic disk medium in the FD rotates. In addition, the main frame 11 has a back surface (not shown) on which a printed-circuit board (not shown) is attached. A number of electronic parts (not shown) are mounted on the printed-circuit board.

In the manner which will become clear later, the FDD comprises a pair of magnetic heads for reading/writing data from/to the magnetic disk medium in the FD. The magnetic heads are supported via gimbals 14 with the carriage 15. A combination of the magnetic heads, the gimbals 14, the carriage 15 is called a carriage assembly. The carriage 15 is disposed over the main surface 11a of the main frame 11 with a space left therebetween. The carriage 15 supports the magnetic heads movably along a predetermined radial direction (i.e. a direction indicated by an arrow B in FIG. 2) to the FD.

The carriage 15 is supported and guided at both lower sides thereof by a pair of guide bars 16 which extend in parallel with the predetermined radial direction B.

The carriage 15 is driven along the predetermined radial direction B by a voice coil motor which will later be described. More specifically, the voice coil motor comprises a pair of voice coils 17 and a pair of magnetic circuits 20. The voice coils 17 are disposed on the carriage 15 at a rear side and are wound around driving axes in parallel with the predetermined radial direction B. The magnetic circuits 20 generate magnetic fields which intersect currents flowing in the voice coils 17. With this structure, by causing the currents to flow in the voice coils 17 in directions where the magnetic fields generated by the magnetic circuits 20 intersect, a driving force occurs along the predetermined radial direction B extending to the driving axes on the basis of interaction between the currents and the magnetic fields.

The driving force causes the voice coil motor to move the carriage 15 along the predetermined radial direction B.

The FD has a shutter (not shown). The FDD includes a shutter drive mechanism for controlling the opening and closing of the shutter of the FD, an ejector mechanism for ejecting the FD, and a carriage lock mechanism for locking the carriage 15 on and after completion of ejection operation.

The FDD includes a lever unit 50 which comprises an ejection lever 51 and a lock lever 52. The ejection lever 51 has a tip 51a. The ejection lever 51 serves as both of a component of the shutter drive mechanism and another component of the ejector mechanism. The lock lever 52 is disposed in the vicinity of the carriage 15 and is operable as a component of the carriage lock mechanism.

The ejector mechanism comprises an ejection push button 54, an ejection plate 55, and a pair of ejection springs 56. More specifically, the FDD includes a front panel (not shown) at a front end thereof. The front panel has a reception opening (not shown) for receiving the FD. The FDD further includes a disk holder unit (not shown) for holding the FD inserted into the FDD. The ejection push button 54 projects into an outer surface of the front panel. The ejection plate 55 locates the FD inserted from the reception opening with the ejection plate opposed to one surface of the PD. Each ejection spring 56 has an end engaged with the ejection plate 55 and another end engaged with the disk holder unit. In addition, the ejection plate 55 is provided with a rack 55a at an end thereof in a depth direction. The rack 55a engages with a pinion (not shown) which is rotatably supported on the main surface 11a of the main frame 11. The lever unit 50 is energized counterclockwise by a spring member 57.

It is presumed that the FD is inserted into the FDD. In other words, the FD is forced into the FDD along the insertion direction indicated by the arrow A in FIG. 1. In this event, the tip 51a of the ejection lever 51 is engaged with a right-hand upper end of the shutter. With movement of the FD, the lever unit 50 rotates in a clockwise direction. As a result, the tip 51a of the ejection lever 51 opens the shutter.

It is assumed that the FD is completely housed in the FDD. Under the circumstances, the FD is held in the disk holder unit by a disk lock mechanism (not shown).

Turning to FIGS. 3A through 3C, the description will proceed to the position detection unit according to the first embodiment of this invention. FIGS. 3A through 3C are a plan view, a left-hand side view, and a rear view, respectively.

The illustrated position detection unit comprises a scale 31 and a photointerrupter 32. More specifically, the scale 31 is mounted on the carriage 15 at a side opposed to the main surface 11a of the main frame 11. The scale 31 extends along both of a direction in parallel with the predetermined radial direction B and a plane perpendicular to the main surface 11a of the main frame 11. The scale 31 has a plurality of light transmission/shield elements 311 which are equally spaced along the direction in parallel with the predetermined radial direction B. In the example being illustrated, the scale 31 is made of an opaque member. The light transmission/shield elements 311 are slits bored through the scale 31. The photointerrupter 32 is mounted on the main frame 11. The photointerrupter 32 includes a head portion or a sensor section 32a which comprises a light-emitting section (not shown) and a light-receiving section (not shown). The light-emitting section and the light-receiving section are opposed to each other with the scale 31 put therebetween. In the example being illustrated, the light-emitting section consists of a light-emitting diode while the light-receiving section consists of four light-receiving elements which are located in phase 90° apart along a direction in parallel with the predetermined radial direction B.

As shown in FIG. 3B, the illustrated position detection unit further comprises an alignment mechanism 33 for positioning the photointerrupter 32 so as to allow the photointerrupter 32 to slide in the direction in parallel with the predetermined radial direction B. More specifically, the photointerrupter 32 is located at an opening section 11b bored through the main frame 11. The opening section 11b has a size so as to allow the photointerrupter 32 to slide in the direction in parallel with the predetermined radial direction B. The illustrated alignment mechanism 33 comprises a substrate 331 for mounting the sensor section of the photointerrupter 32 and at least two screws 332 for fixing the substrate 331 to the main frame 11. The substrate 331 has at least two oval holes 331a each of which is long in shape in a direction in parallel with the predetermined radial direction B. That is, the screws 332 fix the substrate 331 to the main frame 11 via the oval holes 331a. With this alignment mechanism 33, it is possible to align the photointerrupter 32 by sliding the photointerrupter 32 in the direction in parallel with the predetermined radial direction B.

With this structure, the light-emitting section of the photointerrupter 32 emits a light beam which is received by the light-receiving section of the photointerrupter 32 via the light transmission/shield elements or the slits 311. As a result, it is possible to determine a current position of the carriage 15 or the magnetic heads 13 by counting presence/absence of reception of the light beam in the light-receiving section of the photointerrupter 32.

Turning to FIGS. 4A through 4C, the description will proceed to a position detection unit according to a second embodiment of this invention. FIGS. 4A through 4C are a plan view, a right-hand side view, and a rear sectional view, respectively.

The illustrated position detection unit comprises the scale 31 and the photointerrupter 32. The scale 31 is mounted on the carriage (not shown) at a side opposed to the main surface 11a of the main frame 11. The photointerrupter 32 is mounted on the substrate 33 which is mounted on the main frame 11 at a bottom side. The scale 31 extends along both of a direction in parallel with the predetermined radial direction B and a plane perpendicular to the main surface 11a of the main frame 11. The illustrated scale 31 is made of the opaque member.

The scale 31 has the slits 311 bored through the scale 31 at regular intervals along the direction in parallel the predetermined radial direction B. The slits 311 serve as the light transmission/shield elements. In the example being illustrated, the scale 31 is made of stainless steel having a thickness of 0.05 to 0.03 mm and the slits 311 are formed by etching. Inasmuch as the magnetic disk medium of the small capacity FD has eighty tracks at one side which are concentric with one another, the number of the slits 31 must be equal to the number so as to cover a movable range for the carriage 15. In the example being illustrated, the slits 311 are equal in number to sixty.

Figure 5:
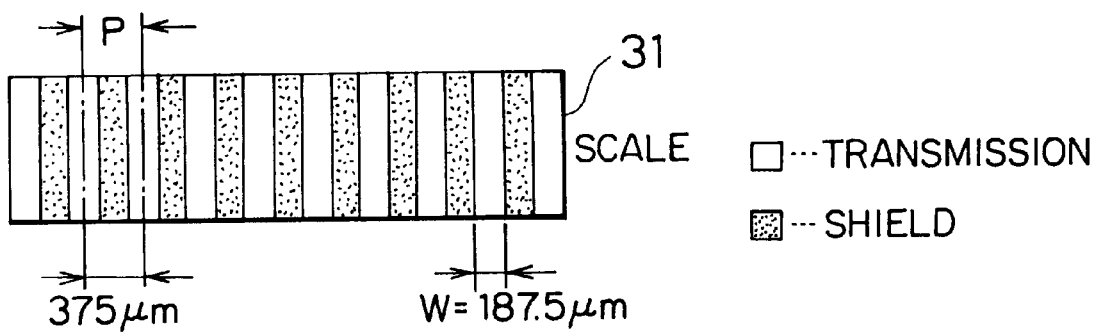
FIG. 5 shows a scale for use in the position detection unit illustrated in FIGS. 4A through 4C.

FIG. 5 shows a slit interval of a slit pitch of the slits 311. As well known in the art, the small capacity FD has a track pitch of 187.5 μm. As a result, each slit 311 has a width W of 187.5 μm and the slit interval or the slit pitch P of the slits 311 is equal to 375 μm which is twice the track pitch.

Turning back to FIG. 4A, the main frame 11 has an opening section 11'b for allowing the sensor section 32a of the photointerrupter 32 to insert therein and an additional opening section 11c for allowing the scale 31 to pass therethrough. That is, the head portion or the sensor section 32a of the photointerrupter 32 is freely inserted in the opening section 11'b. The scale 31 has a bottom portion which is inserted in the additional opening section 11c. In other words, the opening section 11'b allows the photointerrupter 32 to move in the direction in parallel with the predetermined radial direction B. It is therefore possible to carry out alignment for the photointerrupter 32. The additional opening section 11c allows the scale 31 to move in the direction in parallel with the predetermined radial direction B. As shown in FIG. 4C, the illustrated opening section 11'b is a hole having a size larger than that of the sensor section 32a of the photointerrupter 32 so as to allow the photointerrupter 32 to move not only in the direction in parallel with the predetermined radial direction B but also in a direction perpendicular to the predetermined radial direction B. That is, the opening section 11'b has a width of $W'_f$ which is wider than a width $W_i$ of the sensor section 32a of the photointerrupter 32.

As shown in FIG. 4C, the sensor section 32a of the photointerrupter 32 includes a light-emitting unit 34 and a light-receiving unit 35 which are opposed to each other with the scale 31 put therebetween.

Figure 6A:
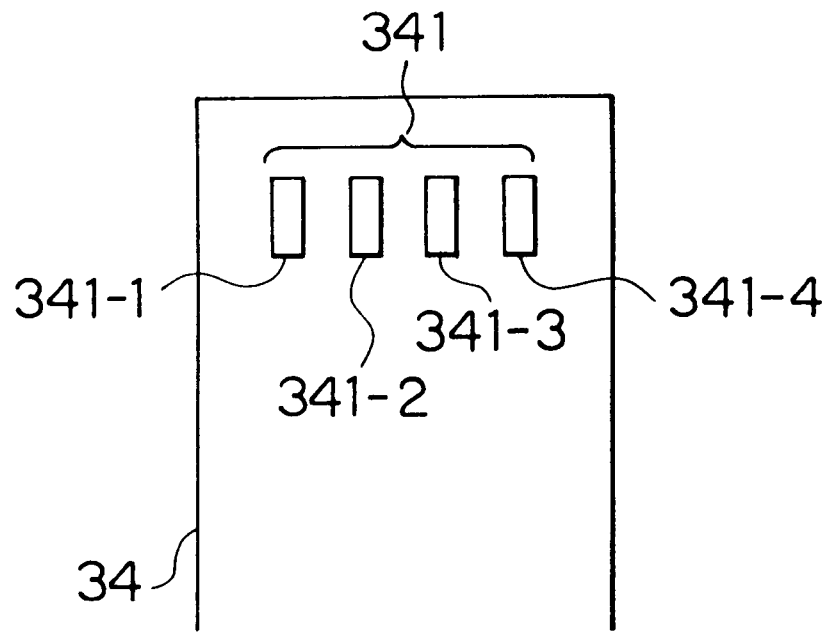
FIGS. 6A and 6B show a light-emitting unit and a light-receiving unit for use in the position detection unit illustrated in FIGS. 4A through 4C, respectively.
Figure 6B:
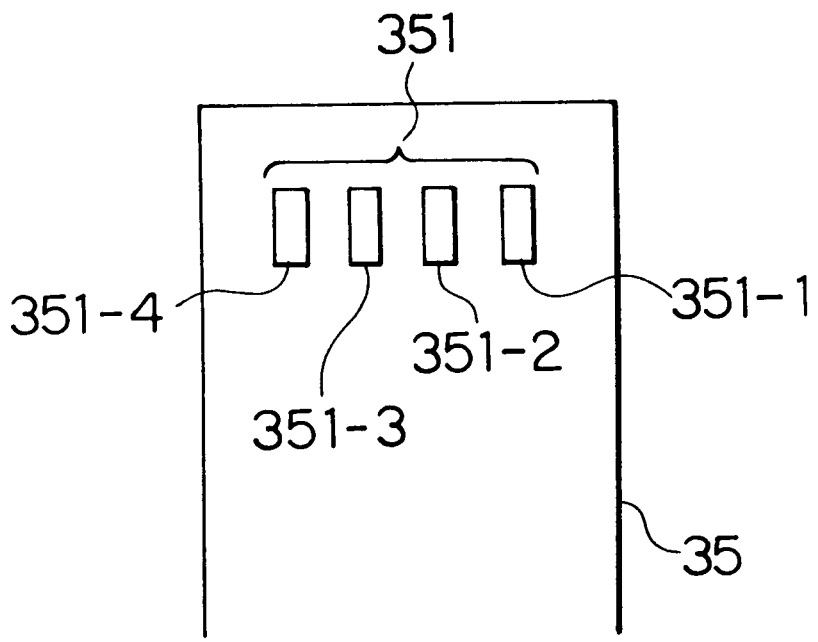

Referring to FIGS. 6A and 6B in addition to FIG. 4C, the light-emitting unit 34 comprises a light-emitting section 341 as shown in FIG. 6A while the light-receiving unit 35 comprises a light-receiving section 351 as shown in FIG. 6B. The light-emitting section 341 and the light-receiving section 351 are opposed to each other with the slits 311 put therebetween. The light-emitting section 341 consists of first through fourth light-emitting elements 341-1, 341-2, 341-3, and 341-4. The light-receiving section 351 consists of first through fourth light-receiving elements 351-1, 351-2, 351-3, and 351-4 which are opposed to the first through the fourth light-emitting elements 341-1 to 341-4, respectively. The first through the fourth light-receiving elements 351-1 to 351-4 are located in phase 90° apart along the direction in parallel with the predetermined radial direction B. In addition, the light-emitting section 341 may consist of only one light-emitting element.

Figure 7:
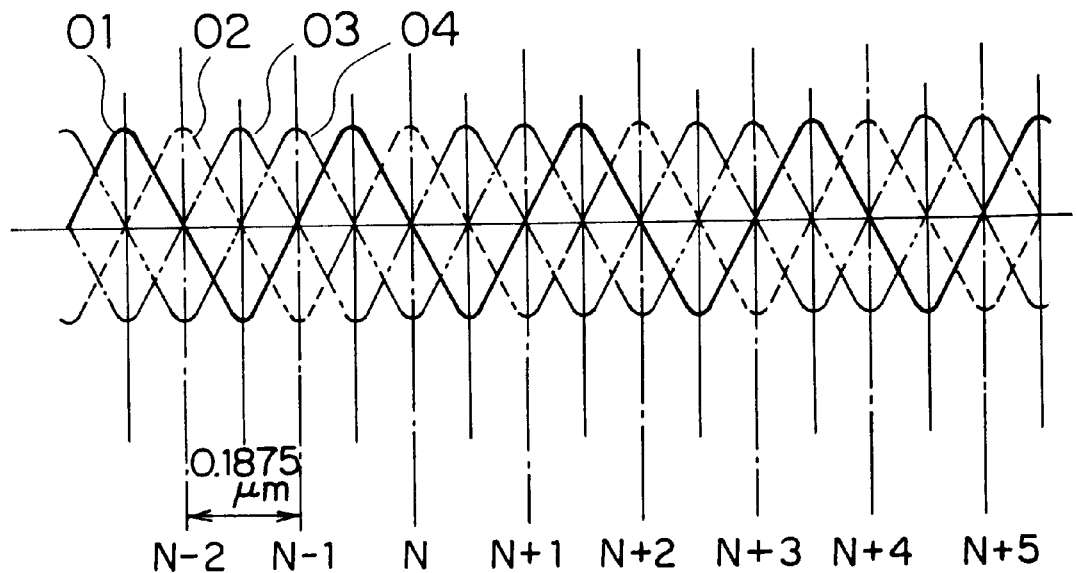
FIG. 7 shows relationship between track positions and output signals of the light-receiving unit illustrated in FIG. 6B.

FIG. 7 shows the relationship between track positions (carriage positions) and output signals of the first through the fourth light-receiving elements 351-1 to 351-4. In FIG. 7, a top or first line indicates the output signals 01 to 04 outputted from the first through the fourth light-receiving elements 351-1 to 351-4 and a second line indicates the track positions (the carriage positions) by numerals N−2 through N+5. As apparent from FIG. 7, the output signals 01 to 04 outputted from the first through the fourth light-receiving elements 351-1 to 351-4 have phase differences of 90°. As a result, it is possible to detect a direction of movement of the carriage 15 (FIG. 2).

At any rate, in the above-mentioned position detection unit, the light beam emitted by the light-emitting unit 34 of the photointerrupter 32 is received by the light-receiving section 351 through the slits 311 of the scale 31. Accordingly, it is possible to determine the current position of the carriage 15 or the magnetic heads by counting presence/absence of reception of the light beam in the the light-receiving section of the photointerrupter 32.

Turning to FIGS. 8A through 8C, a position detection unit according to a third embodiment of this invention is similar to that illustrated in FIGS. 4A through 4C except that a shape of the opening section is modified to be different from that described in conjunction with FIGS. 4A through 4C as will later become clear. The opening section is therefore depicted at 11b.

As shown in FIG. 8C, the illustrated opening section 11b allows the photointerrupter 32 to move only the direction in parallel with the predetermined radial direction B and it result in carrying out alignment for the photointerrupter 32. That is, the opening section 11b inhibits the photointerrupter 32 from moving the direction perpendicular to the predetermined radial direction B. In other words, the opening section 11b has a width of $W_f$ which is substantially equal to the width $W_i$ of the sensor section 32a of the photointerrupter 32. Accordingly, the opening section 11b serves as a guide hole for allowing the photointerrupter 32 to move only the direction in parallel with the predetermined radial direction B.

With this structure, it is possible to stably position the photointerrupter 32. This is because the opening section 11b has the width of $W_f$ which is substantially equal to the width $W_i$ of the sensor section 32a of the photointerrupter 32.

Turning to FIGS. 9A through 9C, a position detection unit according to a fourth embodiment of this invention is similar to that illustrated in FIGS. 4A through 4C except that the scale and the photointerrupter are modified to be different from those described in conjunction with FIGS. 4A through 4C as will later become clear. The scale and the photointerrupter are therefore depicted at 31A and 32A, respectively.

Figure 9D:
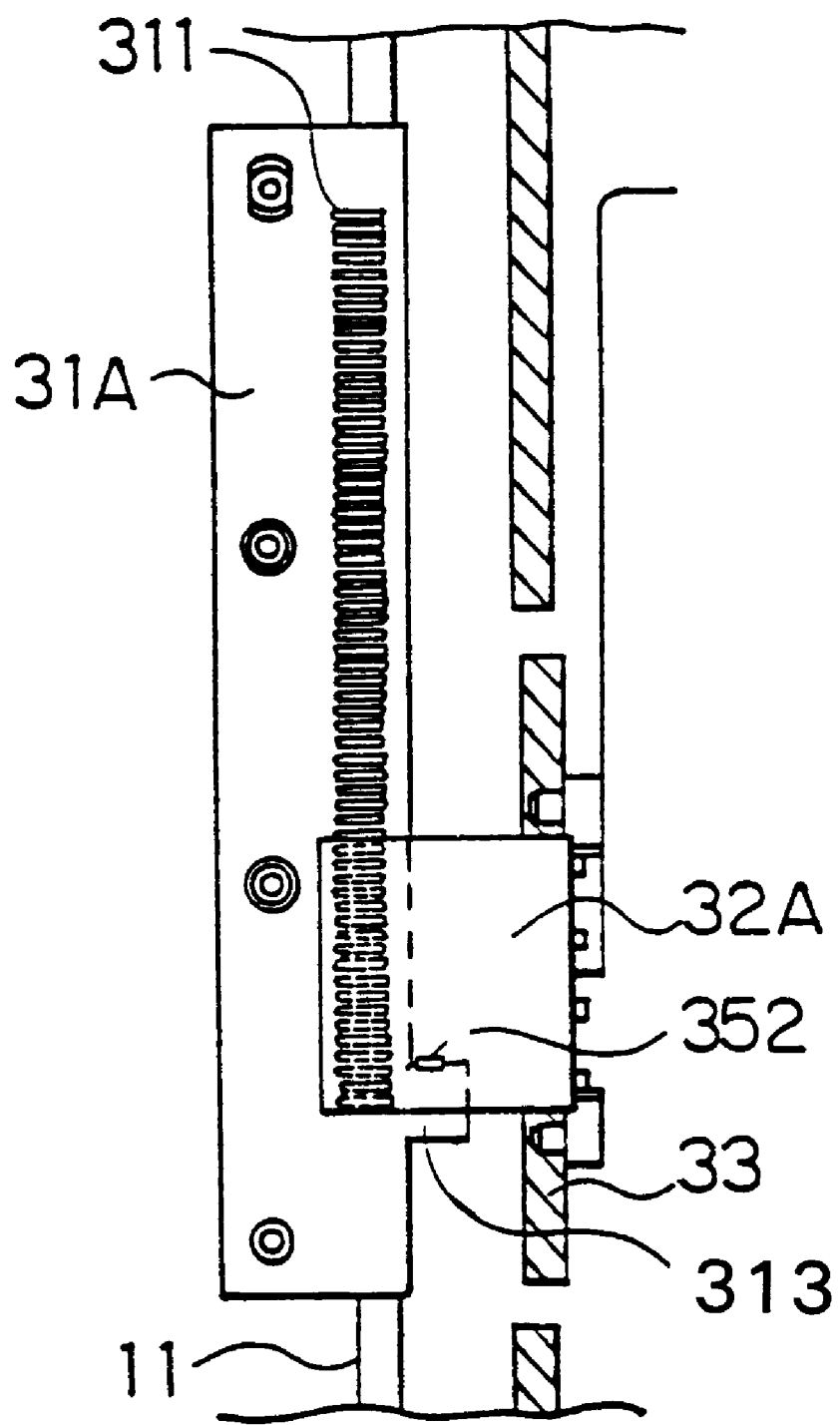

The scale 31A has not only the light transmission/shield elements or the slits 311 but also an additional light transmission/shield element 312 for use in detecting a position corresponding to the end most track Tr00 in the magnetic disk medium of the FD. In the example being illustrated, the additional light transmission/shield element 312 is a clipped section clipped out of the scale 31A at a lower end as shown in FIG. 9B. In place of the clipped section, the additional light transmission/shield element 312 may be a projection section 313 (see FIG. 9D) projecting out of the scale 31A in a downward direction or an opening window bored through the scale 31A at a lower side.

FIGS. 9A and 9B show a state where the magnetic heads 13 (FIG. 3B) supported by the carriage 15 are positioned on the end most track Tr00 in the magnetic disk medium of the FD. The scale 31A may move from this position to a position depicted at 31' where the magnetic heads 13 are positioned on the inner most circumferential track in the magnetic disk medium of the FD.

The photointerrupter 32A comprises the light-emitting unit and the light-receiving unit which are modified to be different from those described in conjunction with FIGS. 4A through 4C as will later become clear. The light-emitting unit and the light-receiving unit are therefore depicted at 34A and 35A, respectively.

Figure 10A:
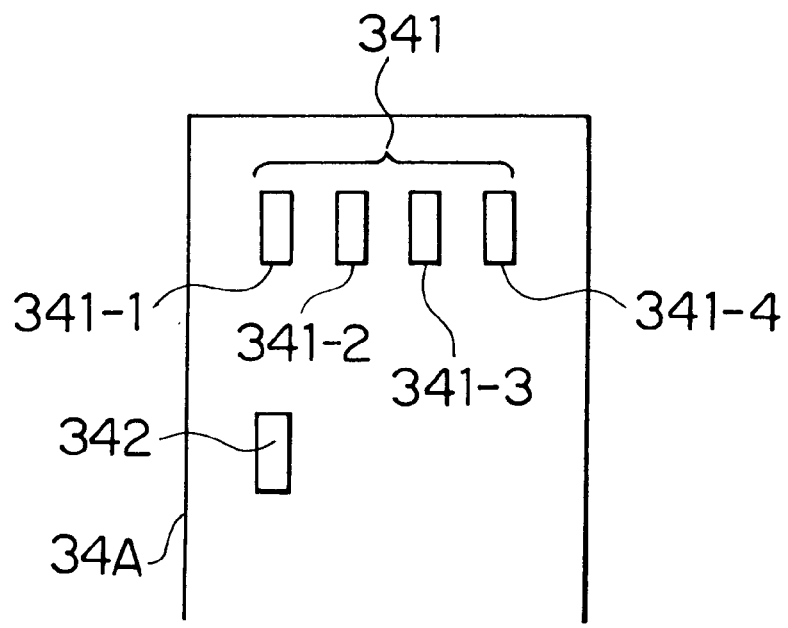
FIGS. 10A and 10B show a light-emitting unit and a light-receiving unit for use in the position detection unit illustrated in FIGS. 9A through 9C, respectively.
Figure 10B:
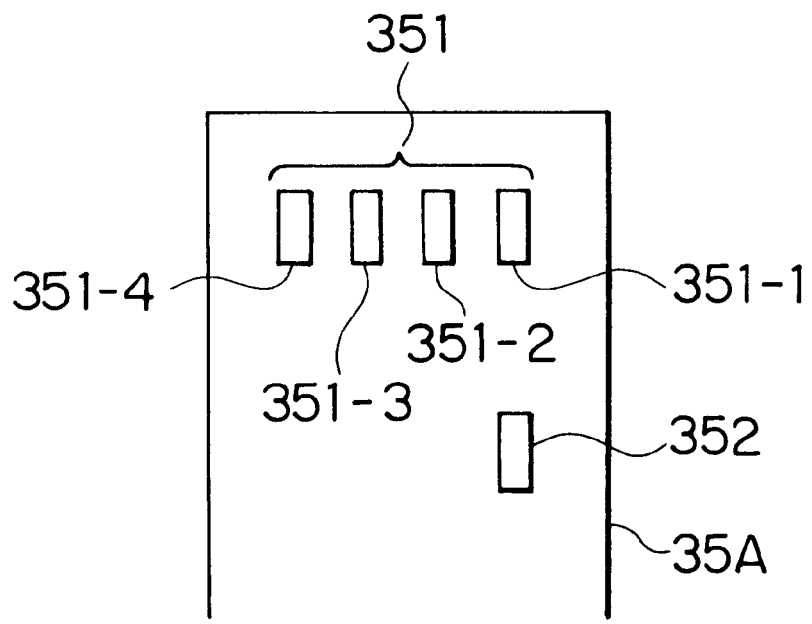

Referring to FIGS. 10A and 10B as well as FIG. 9C, the light-emitting unit 34A comprises not only the light-emitting section 341 but also an additional light-emitting section 342 and the light-receiving unit 35A comprises not only the light-receiving section 351 but also an additional light-receiving section 352. The additional light-emitting section 342 and the additional light-receiving section 352 are opposed to each other at a position corresponding to the additional light transmission/shield element 312.

A combination of the additional light-emitting section 342 and the additional light-receiving section 352 detects presence/absence of the additional light transmission/shield element or the clipped section 312 to determine the position of the end most track Tr00 in the magnetic disk medium of the small capacity FD inserted into the FDD. In the example being illustrated, as shown in FIG. 9B, the position of the end most track Tr00 in the magnetic disk medium of the small capacity FD is a transition point which shifts from a state where the additional light-receiving section 352 receives a light beam from the additional light-emitting section 342 through the clipped section 312 to another state where the additional light-receiving section 352 cannot receive the light beam from the additional light-emitting section 342 by movement of the carriage 15 at an inner radial side in the small capacity FD (i.e. when one edge of the clipped section 312 corresponding to the transition point is detected).

Figures 11A, 11B:
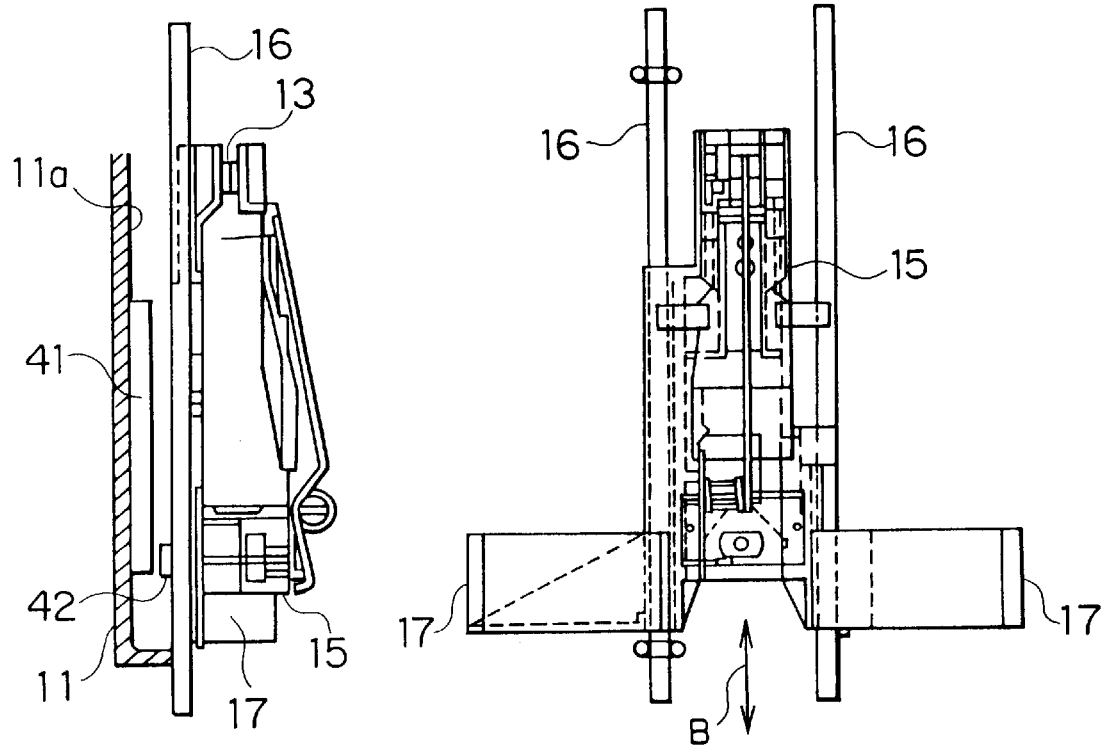
FIGS. 11A through 11C collectively show a position detection unit according to a fifth embodiment of this invention.
Figure 11C:
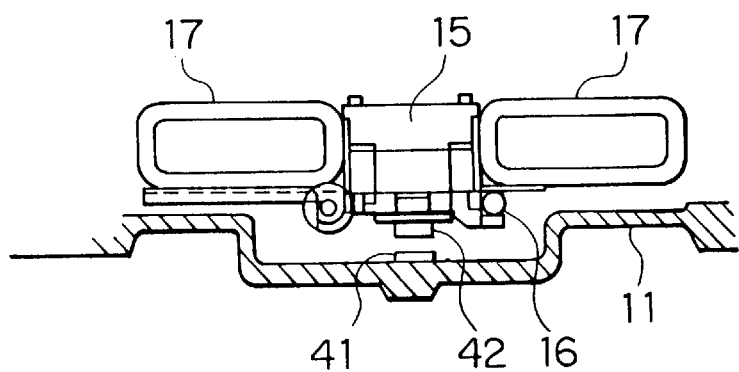

Turning to FIGS. 11A through 11C, the description will proceed to a position detection unit according to a fifth embodiment of this invention. FIGS. 11A through 11C are a plan view, a left-hand side view, and a rear view, respectively.

The illustrated position detection unit comprises a magnetic scale 41 and a magnetic sensor 42. More specifically, the magnetic scale 41 is mounted on the main surface 11a of the main frame 11 at a side opposed to the carriage 15. The magnetic sensor 42 is mounted on the carriage 15 with the magnetic sensor 42 opposed to the magnetic scale 41.

Figure 12:
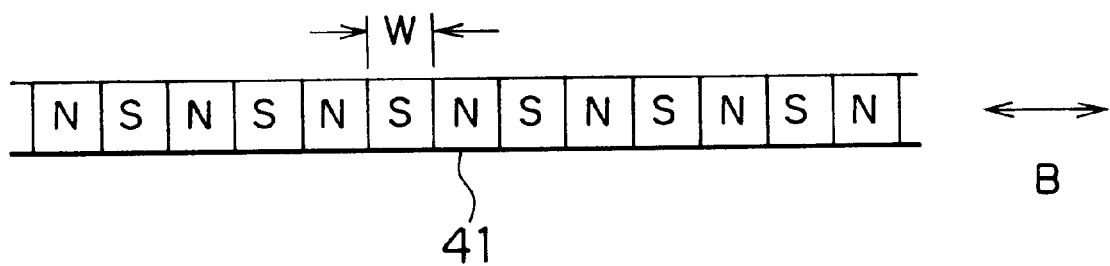
FIG. 12 shows a magnetic scale for use in the position detection unit illustrated in FIGS. 11A through 11C.

Temporarily referring to FIG. 12, the magnetic scale 41 has a plurality of magnetic poles which extend to a direction in parallel with the predetermined radial direction B and which are periodically reversed at regular intervals. That is, each magnetic pole (i.e. a north pole depicted at N or a south pole depicted at S) composing the magnetic scale 41 has a magnetized width W which is substantially equal to the track pitch in the magnetic disk medium of the small capacity FD inserted into the FDD shown in FIG. 2. In addition, the total number of the magnetic poles composing the magnetic scale 41 is not less than the number of the tracks in the magnetic disk medium of the small capacity FD.

In the example being illustrated, the magnetic sensor 42 comprises a magneto-resistive (MR) element having resistance which varies in dependence on strength of magnetic field. Inasmuch as the MR element has the variable resistance due to the strength of the magnetic field, the MR element is advantageous in that it is possible to certainly detect the strength of the magnetic field generated by the magnetic scale 41 although the MR element does not relatively move to the magnetic scale 41.

With this structure, it is possible to determine the current position of the carriage 15 or the magnetic heads 13 by detecting in the magnetic sensor 41 any changes of the strength of the magnetic field generated by the magnetic scale 41.

Figures 13A, 13B:
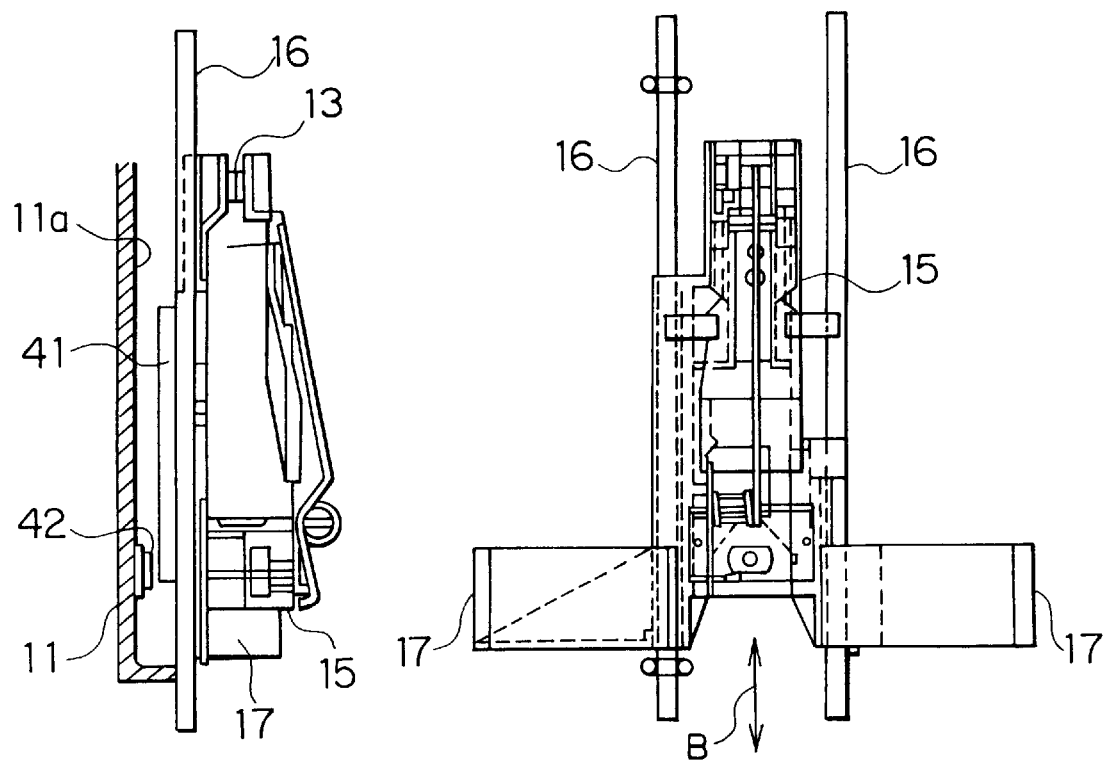
FIGS. 13A through 13C collectively show a position detection unit according to a sixth embodiment of this invention.
Figure 13C:
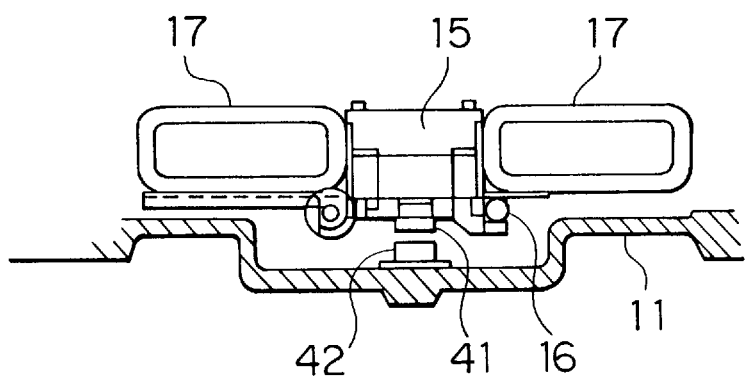

Turning to FIGS. 13A through 13C, a position detection unit according to a sixth embodiment of this invention is similar to that illustrated in FIGS. 11A through 11C except that the disposition of the magnetic scale 41 and the magnetic sensor 42 is modified to be different from that described in conjunction with FIGS. 11A through 11C as will later become clear.

That is, in the position detection unit according to the sixth embodiment of this invention, the magnetic scale 41 is mounted on the carriage 15 at a side opposed to the main surface 11a of the main frame 11 while the magnetic sensor 42 is mounted on the main surface 11a of the main frame 11 with the magnetic sensor 42 opposed to the magnetic scale 41.

With this structure, the effect is similar to that illustrated in FIGS. 11A through 11C.

While this invention has thus far been described in conjunction with several preferred embodiments thereof, it will now be readily possible for those skilled in the art to put this invention into various other manners. For example, the position detection unit according to this invention may be applied to other various magnetic recording/reproducing units of the type in which the carriage is driven by the linear motor as well as the high density type FDD. The scale may be made of a transparent member although the scale is made of the opaque member in the above-mentioned embodiments. In this event, as the light transmission/shield elements may be used thin pieces made of opaque material that are stuck on the scale. In addition, as the additional light transmission/shield element may be used a tape-shaped piece made of opaque material that are stuck on the scale. Without restriction to the above-mentioned ones, various types of light transmission/shield elements or additional light transmission/shield elements may be used. The magnetic sensor 42 is not restricted to the MR element and other magnetic sensors such as a Hall device may therefore be used as the magnetic sensor 42.

What is claimed is:

1. A magnetic disk drive for driving a magnetic disk inserted thereinto, comprising:

a main frame having a main surface;

a magnetic head for reading/writing data from/to said magnetic disk;

a carriage for supporting said magnetic head, with a space being provided between said carriage and said main surface of said main frame;

a linear motor for moving said carriage in a predetermined radial direction; and a position detection unit for detecting a current position of said magnetic head, said position detection unit comprising: (i) a scale mounted on said carriage at a side thereof opposed to said main surface of said main frame, and (ii) a photointerrupter mounted on said main frame and including a sensor section comprising a light-emitting section and a light-receiving section which are opposed to each other with said scale arranged therebetween, said scale extending both parallel to the predetermined radial direction and along a plane perpendicular to said main surface of said main frame, and said scale being made of an opaque member and having a plurality of light transmission/shield elements which comprise slits bored through said scale at substantially equally spaced intervals along said scale in a direction parallel to the predetermined radial direction;

wherein said main frame comprises an opening section having a width which is substantially equal to a width of said sensor section, thereby allowing said photointerrupter to move only in parallel with the predetermined radial direction.

2. A magnetic disk drive as claimed in claim 1, wherein said main frame further comprises an additional opening section to allow said scale to move in parallel with the predetermined radial direction.

3. A magnetic disk drive for driving a magnetic disk inserted thereinto, comprising:

a main frame having a main surface;

a magnetic head for reading/writing data from/to said magnetic disk;

a carriage for supporting said magnetic head, with a space being provided between said carriage and said main surface of said main frame;

a linear motor for moving said carriage in a predetermined radial direction;

a position detection unit for detecting a current position of said magnetic head, said position detection unit comprising: (i) a scale mounted on said carriage at a side thereof opposed to said main surface of said main frame, and (ii) a photointerrupter mounted on said main frame and including a sensor section comprising a light-emitting section and a light-receiving section which are opposed to each other with said scale arranged therebetween, said scale extending both parallel to the predetermined radial direction and along a plane perpendicular to said main surface of said main frame, and said scale being made of an opaque member and having a plurality of light transmission/shield elements which comprise slits bored through said scale at substantially equally spaced intervals along said scale in a direction parallel to the predetermined radial direction; and an alignment mechanism for positioning said photointerrupter so as to allow said photointerrupter to slide parallel to the predetermined radial direction;

wherein said main frame comprises an opening section having a width wider than a width of said sensor section, thereby allowing said photointerrupter to also move in a direction perpendicular to the predetermined radial direction.

4. A magnetic disk drive as claimed in claim 3, wherein said main frame further comprises an additional opening section to allow said scale to move in parallel with the predetermined radial direction.

* * * * *